Patented Mar. 25, 1930

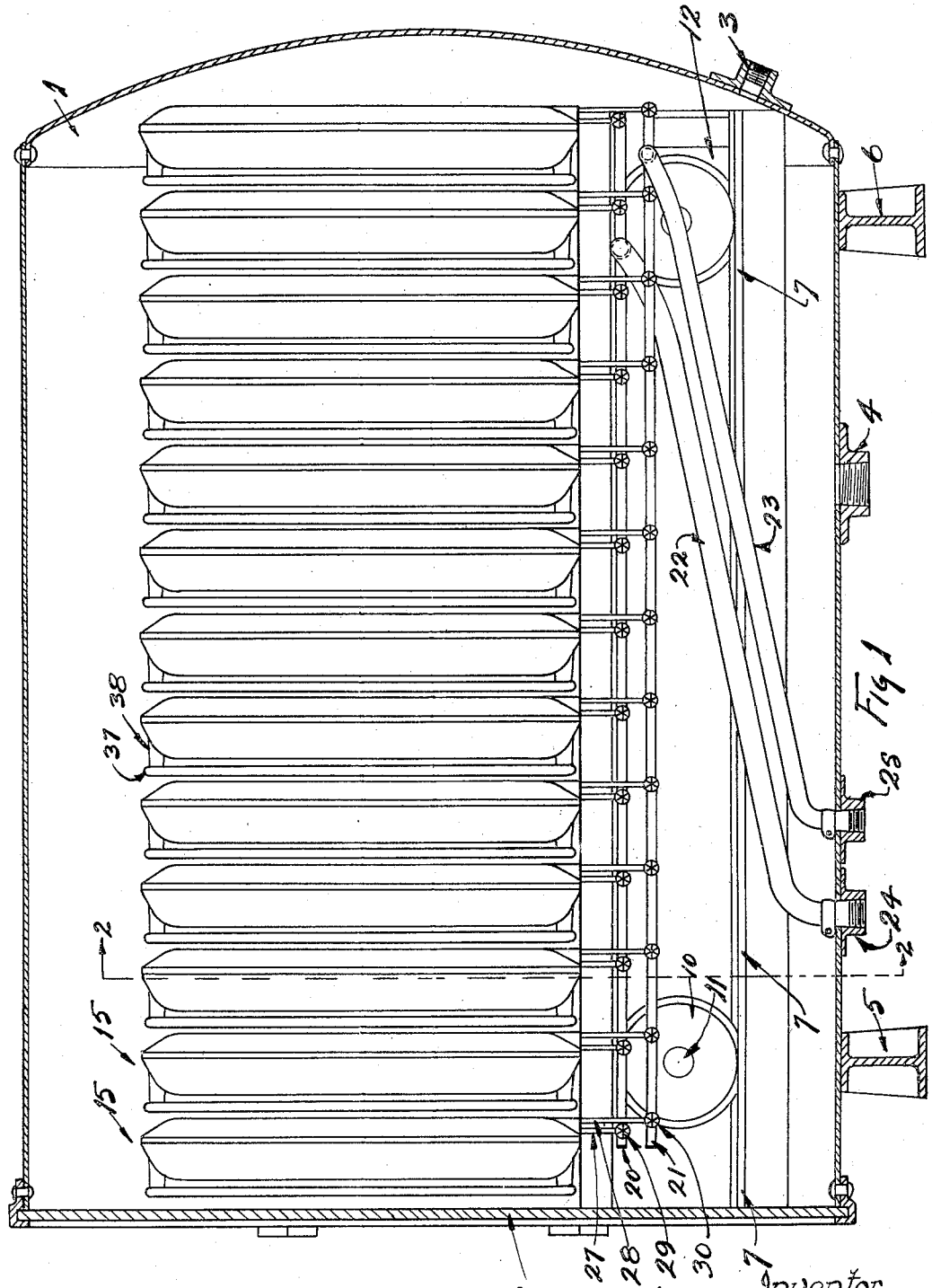

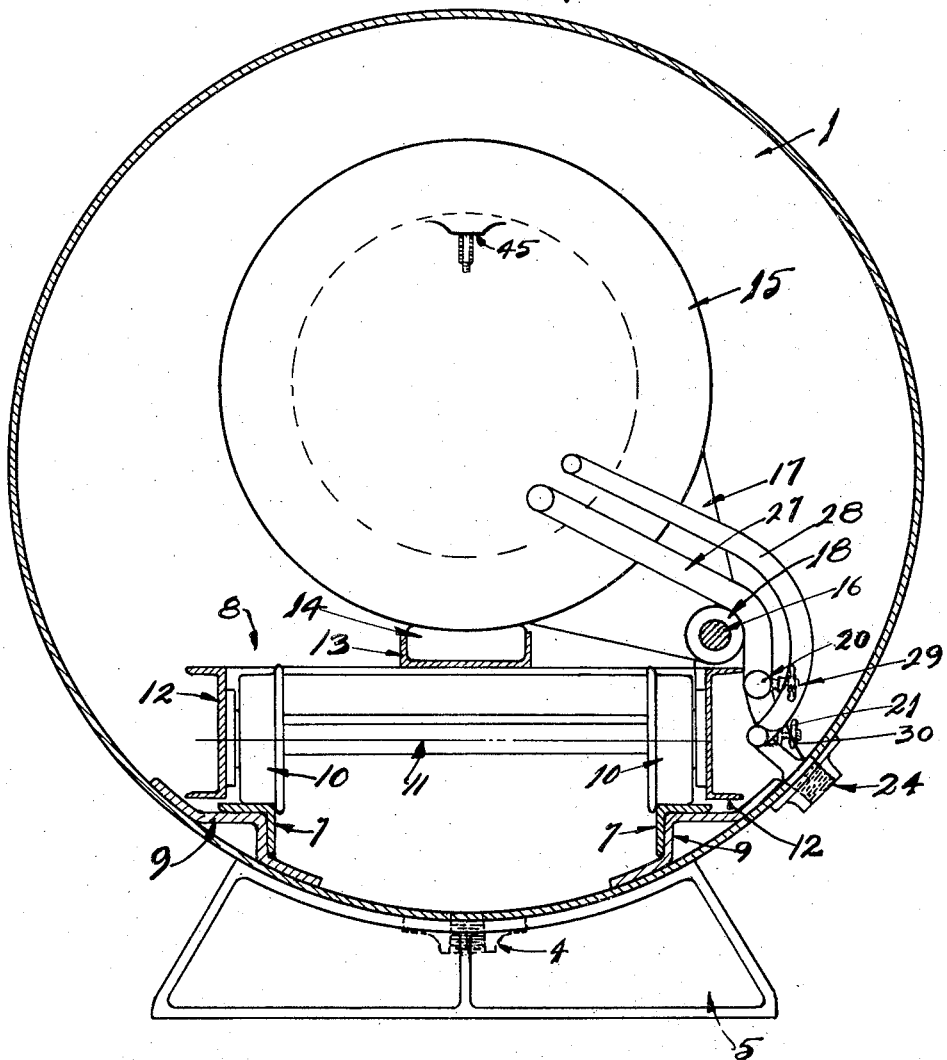

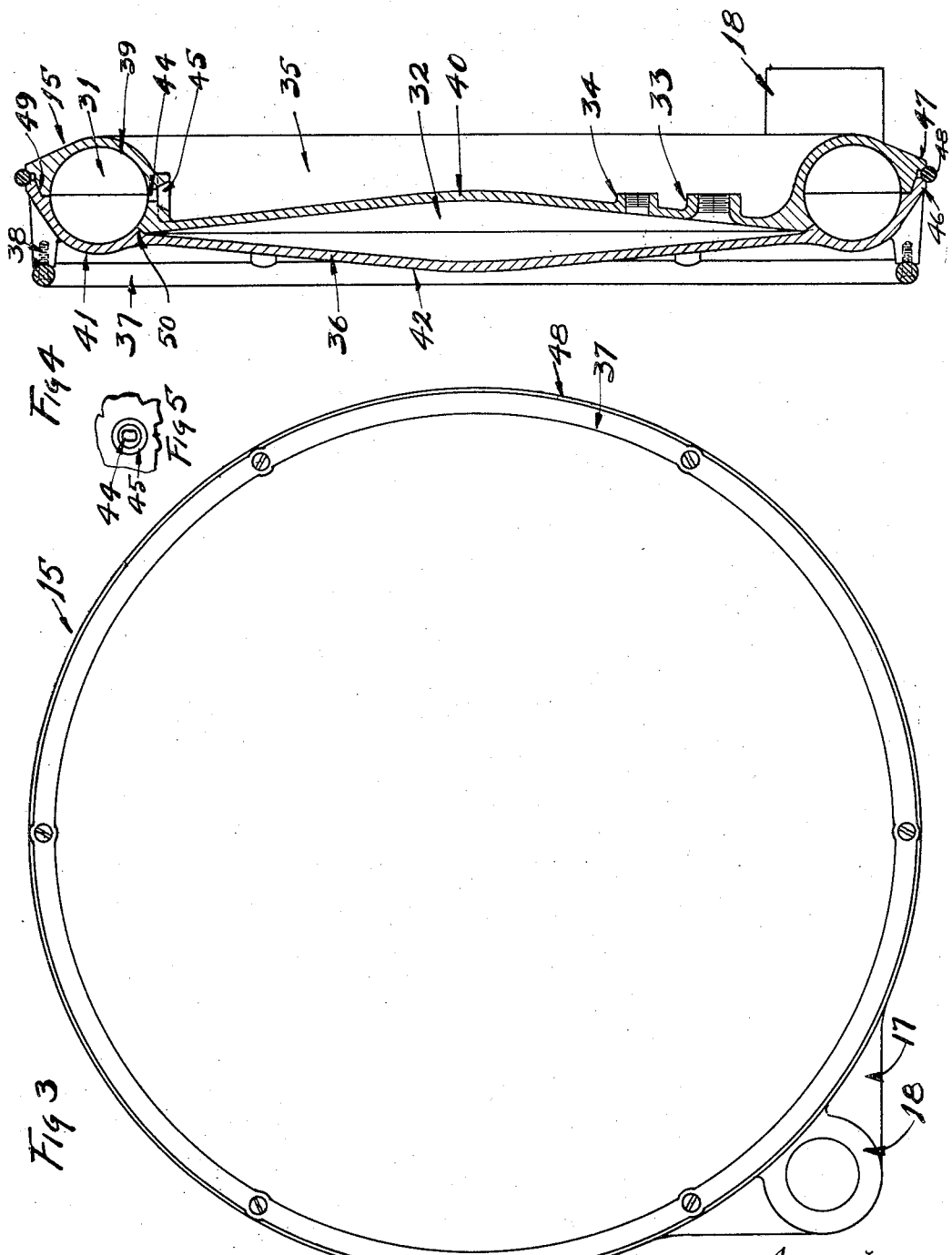

1,751,803

UNITED STATES PATENT OFFICE

THOMAS L. FAWICK, OF RACINE, WISCONSIN

MOLD FOR CURING HOLLOW MOLDED ARTICLES

Application filed October 3, 1927. Serial No. 223,529.

My invention relates to curing molds for curing hollow molded articles. While the specific embodiment which I shall describe herein is a mold for curing inner tubes for pneumatic tires it is to be understood that the invention is not to be limited to such use.

According to present methods of curing inner tubes these articles are disposed in a hollow mold which is manually clamped in closed position. Pneumatic pressure as of an inner gas is introduced into the interior of the tube and heat as from live steam is applied to the exterior of the mold.

The operations of manually clamping and releasing the mold are laborious and expensive and the introduction of the inner gas and release of the same requires special operation.

According to my invention I provide pneumatic means for clamping and releasing each mold so that the time and labor required to insert and remove the tube is greatly diminished. In addition to this the pneumatic effect which I employ holds the molds closed and exerts a highly beneficial effect upon the tube itself in the mold tending to increase the pressure of the tube against the wall of the mold to secure better heat transfer and to compact the plastic body of the article to be molded.

Another important feature of my invention resides in the admission of live steam into the interior of the hollow article to be cured, this live steam assisting in curing the rubber from the inside and also applying suitable pressure to the inner wall to bring the wall of the tube into close thermal contact with the wall of the mold. This introduction of live steam within hollow articles to cure the same, I believe to be broadly new.

In the preferred form of my invention the mold, or a plurality of molds, is subjected to external steam pressure which tends to hold the parts of the mold closed. At the same time the interior of the mold outside of the tube or other article is subjected to suction. The interior of the tube or other hollow article is, at the same time, subjected to live steam pressure. The result of these pneumatic actions is first to compact the plastic material, that is the rubber, and press it firmly into thermal engagement with the mold, next to hold the mold firmly closed. At the same time the article is cured by heat applied externally and internally.

The mold of my invention may be made of relatively thin stock and hence easily and quickly heated up and relatively inexpensive to manufacture.

Also in the preferred embodiment a plurality of molds are hinged on a horizontal axis and set on edge upon a carriage which may be wheeled into or out of a steam chamber. This provides a multiple cure. Suitable flexible leads for suction and air pressure are connected to the carriage and manifolded through suitable control valves to the individual molds. These leads extend through the walls of the steam chamber so that the pneumatic actions may be carried on and controlled without changing connections whether the molds are within the steam chamber or outside thereof.

Other advantages and novel features of my invention will be apparent from the following detailed description which taken in conjunction with the accompanying drawings will teach one skilled in the art how to construct and operate a device embodying my invention.

In the drawings:

Fig. 1 is a longitudinal section through a steam chamber showing the carriage containing the mold cases in side elevation the connection of the flexible air pressure and suction leads is shown out of actual position in the figure.

Fig. 2 is a central vertical cross section of the device shown in Fig. 1, showing one of the mold cases in front elevation.

Fig. 3 is a front elevation of an individual mold case; the web for the pivot being foreshortened in this and the following figure.

Fig. 4 is a vertical cross section view of the same, and

Fig. 5 is a fragmentary elevation of a detail.

Referring first to Figs. 1 and 2 I have shown a steam chamber 1 which comprises a steel drum having the removable closure 2, this chamber having a connection 3 for the admission of live steam thereto and a drain or steam outlet 4 for exhausting the condensate from the interior of the steam chamber.

The steam chamber 1 is mounted upon supporting pedestals 5 and 6. Within the steam chamber a pair of longitudinal tracks 7 are provided for receiving the wheeled carriage 8. The tracks 7 are extended on the exterior of the steam chamber in such manner that the wheeled carriage 8 may be run into the steam chamber and the closure 2 put in place or the closure 2 may be opened and the carriage run outside as will be explained later. The tracks 7, 7 as shown comprise angle bars mounted upon suitable brackets 9, 9 secured to the walls of the steam chamber 1. The carriage or truck 8 may be of any preferred form having the flanged wheels 10, 10 connected by suitable axle 11 at each end thereof. The axles 11 are journaled in side frames or channel frames 12, 12 which form the main sills of the carriage or truck. These sills 12, 12 are connected together at their ends to form a rigid frame. Upon this rigid frame a longitudinal channel 13 is mounted and in the hollow of the channel 13 there is disposed a cushion 14 running the full length of the carriage for receiving the weight of the mold cases 15 which rest thereupon. The mold cases 15 are hinged on a horizontal shaft 16 said mold cases having individual webs or brackets 17 terminating in the hubs 18 which hubs are mounted upon the horizontal shaft 16 to permit the molds to be swung sidewise on the horizontal axis of the shaft 16.

At the side of the carriage 8 manifold pipes 20 and 21 are mounted, these pipes being employed for vacuum and air pressure connections respectively.

These manifold pipes 20 and 21 are connected through flexible lead lines 22 and 23 respectively leading to couplings 24 and 25 on the exterior walls of the steam chamber 1, preferably connected through the side as shown in Fig. 2. In Fig. 1 the connections are shown for the sake of clearness as disposed in the vertical plane.

These flexible lead lines 22 and 23 permit the carriage to be run out of the steam chamber for filling and emptying of the molds without the requirement to disconnect the manifolds from the source of suction and air pressure.

The individual mold cases 15, 15 are all alike in construction and they have connection with the manifolds 20 and 21 through individual flexible leads 27 and 28 leading respectively to the suction manifold and the compressed air manifold 20 and 21 respectively through suitable individual valves 29 and 30. By the individual valves 29 and 30 suction and compressed air under the control of the operator may be applied to the interior of the individual mold cases. The individual mold cases shown in detail in Figs. 3, 4, and 5 provide a mold chamber 31 to receive the article to be molded, namely the inner tube, and a suction chamber 32, said suction chamber having the connections at 33 and 34 respectively for the suction and compressed air pipes 27 and 28, respectively.

The mold case is split to provide a main or relatively stationary part 35 which is hinged on the hub 18 heretofore referred to. The removable or cover part 36 is provided with a handle 37 in form of a continuous peripheral ring fastened to post or bosses 38 integral with said mold part.

The stationary mold part 35 comprises the outer channel shaped portion 39 and the central disc portion 40 connected to the interior peripheral part of said channel portion 39. Likewise the outer mold part 36 comprises the complementary channel portion 41 and the central disc portion 42 connected to the interior peripheral edges of the channel or grooved portion 41. These mold parts are split not on a diameter but with the channel or groove portion 39 comprising the major part of the periphery of the cross section so that the tube may be mounted in said groove portion 39 with the valve stem projecting through an opening 44 and said uncured inner tube being supported interiorly in said groove shaped portion 39. A conical seat 45 about the valve stem opening 44 is provided for the insertion of a packing washer to seal the space about said valve stem.

The outer peripheries of the mold parts 35 and 36 terminate in flanges 46 and 47 which are spaced a short distance from each other so that a rubber or other suitable sealing ring 48 may seal off the periphery of said mold portion and thereby seal the entire casing.

The meeting edges of the two parts of the case are complementary conical surfaces to give as tight a joint as practical under the circumstances. The exterior joints 49 adjacent the sealing ring 48 is made as tight as circumstances will permit and it is intended to be rendered completely tight by the sealing ring 48, but the inner joint 50, while it is preferably made close is not necessarily tight and in fact a certain desirable result follows from a slight permissible leakage at this point.

The operation of the device is as follows:

Assume that the closure 2 is removed and the carriage run on the steam chamber 1, steam being exhausted previous to such opening. The first mold 15 will now be moved on the axis 16 in clockwise direction to swing said mold clear of the other molds, thereupon the suction connection is cut off at the valve 29 and the valve 30 is opened to admit a small amount of compressed air which will immediately release the cover from the stationary mold part. By means of the circular handle 37 the cover portion 36 is removed and set to one side, the tube is released by first removing sealing washer in the seat 45 and the valve stem is then withdrawn through the opening 44 and the cured tube removed from the grooved mold part 31. A raw rubber tube is then introduced to the mold by inserting the valve stem through the opening 44 introducing the sealing washer or packing in the seat 45 about the valve stem. A small amount of inert gas may be introduced into the tube to inflate the same slightly to assist in preventing any part of the tube from being caught or pinched in closing the mold. Thereupon the mold part is closed and the valve 20 is opened to admit suction, the mold part immediately being held closed by the preponderance of air pressure on the exterior side of the discs 40 and 42. Thereupon the sealing ring 48, which is preferably an endless ring stretched over the posts 38, is rolled into position between the flanges 46 and 47. The mold being thereby sealed air is exhausted from the interior of the suction chamber 32 and due to leakage past the seat or joint 50 the air will be withdrawn from between the side walls of the mold and the side walls of the tube to be cured. The suction extends into the mold chamber 31 and tends to pull the hollow walls of the inner tube into contact with the sides of the surrounding mold casing 31.

The valve stem of the inner tube is not provided with a valve but is open so that the interior of the tube to be cured is open to the outside through said valve stem.

The mold case 15 is then swung about its pivot 16 back into place on the carriage resting on the cushion 14. The valve 29 continues to remain open holding the mold part tightly sealed. The mold cases 15 are in succession thus opened, the cured tubes removed and green rubber tubes inserted until the entire batch is ready for another cure. Thereupon the carriage 8 is run into the steam chamber 1, the closure 2 is put in place, steam is admitted through the inlet 3 of a proper pressure and temperature to cure the tube.

As pointed out before, the valve stems being merely hollow tubes without valves therein, permit free communication between the interior of the tube to be cured and the space exterior of the same.

Live steam which is admitted to the steam chamber 1 thereupon enters the interior of the tube to be cured thereby accelerating the cure and also providing a desirable pneumatic pressure on the inside of the tube which in conjunction with the suction on the outside thereof forces the body of the tube firmly into engagement with the walls of the mold compacting the rubber and at the same time securing better thermal contact between the mold and the tube.

I have found by experiment that when the mold is removed from the steam chamber no condensate remains within the inner tube as the release of pressure tends to evaporate any condensate which may have remained within the same so that the tube, while it has had steam on the inside thereof assisting in the curing, comes out of the mold perfectly dry inside and outside.

The mold is held together during vulcanization by a fluid pressure difference which is highly effective.

The steam pressure upon the outside of the mold may be for example 50# gage per square inch. This pressure acts upon the entire external area of the mold. The same steam pressure is exerted on the inside of the tube in the mold counterbalancing the external pressure of the steam upon an equal external area.

Since, however, the mold outside the tube is subjected to suction there is an effective pressure difference created equal in unit value to the amount of vacuum present within the mold chamber. This pressure difference alone provides a large force tending to hold the mold closed.

Now in addition to that force there is the pressure difference between suction on the inside of the suction chamber defined by the discs 40 or 42 and steam pressure on the outside of the chamber. This provides an additional clamping force of very great amount clamping the mold parts together.

I do not intend to be limited to the details shown or described.

I claim:

1. A split mold case for curing an inner tube comprising two parts each part comprising an annular groove portion, said grooves defining a mold for the tube and a plate within and rigid with said grooved portions, said plates defining the sides of a suction chamber.

2. A split watch case type of mold, the mold parts of which have central webs, said webs forming the sides of a suction chamber, the mold parts having internal peripheral meeting faces and external peripheral meeting faces, said external meeting faces defining the limits within which suction may operate.

3. In combination a steam chamber, a carriage adapted to be movable into or out of the steam chambers, a plurality of mold cases disposed on edge on said carriage and hinged thereto on a horizontal axis, said mold cases comprising removable lid portions, each mold case comprising a peripheral mold chamber and an internal suction chamber.

4. In combination a steam chamber, a carriage adapted to be movable into or out of the steam chambers, a plurality of mold cases disposed on edge on said carriage and hinged thereto on a horizontal axis, said mold cases comprising removable lid portions, each mold case comprising a peripheral mold chamber and an internal suction chamber and a suction connection extending through the wall of the chamber and being manifolded to the suction chambers of said mold cases.

5. In combination in a mold case a pair of complementary mold case parts, each part comprising a mold portion and a suction chamber portion, said mold portions having tapered conical meeting surfaces and exterior perpiheral flanges and a sealing member for sealing the joints between said flanges.

6. The combination of two disc like members comprising an annular mold cavity combined with a disc like receptacle constituting a vacuum chamber within the compass of the annular molding cavity.

In witness whereof, I hereunto subscribe my name this 30th day of September, 1927.

THOMAS L. FAWICK.